US010200922B2

(12) United States Patent
Fang

(10) Patent No.: US 10,200,922 B2
(45) Date of Patent: Feb. 5, 2019

(54) SATELLITE NETWORK SWITCHING

(71) Applicant: Space Systems/Loral, LLC, Palo Alto, CA (US)

(72) Inventor: Jun Fang, San Jose, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 0 days.

(21) Appl. No.: 15/618,897

(22) Filed: Jun. 9, 2017

(65) Prior Publication Data

US 2018/0359670 A1    Dec. 13, 2018

(51) Int. Cl.
*H04W 36/38* (2009.01)
*H04W 36/08* (2009.01)
*H04W 36/32* (2009.01)
*H04W 84/06* (2009.01)
*H04W 88/16* (2009.01)

(52) U.S. Cl.
CPC ........... *H04W 36/08* (2013.01); *H04W 36/32* (2013.01); *H04W 36/385* (2013.01); *H04W 84/06* (2013.01); *H04W 88/16* (2013.01)

(58) Field of Classification Search
CPC .......... H04B 7/18508; H04B 7/18584; H04M 15/68; H04M 2215/0196; H04L 47/50; H04L 47/522; H04L 47/6215; H04L 49/90; H04L 67/12; H04W 84/005
USPC ..... 455/12.1, 13.2, 427, 428, 430, 426, 188, 455/431, 3.02, 414.1; 701/214, 208, 213, 701/3, 200, 22; 370/235, 412, 316, 323, 370/254, 331
See application file for complete search history.

(56) References Cited

U.S. PATENT DOCUMENTS

| 6,147,980 | A | * | 11/2000 | Yee | H04B 7/18508 370/316 |
| 6,208,859 | B1 | * | 3/2001 | Halvorson | H04B 7/18567 340/988 |

(Continued)

OTHER PUBLICATIONS

Perkins, "IP Mobility Support for IPv4," Network Working Group, Mobile IP (MIPv6 and v4): host-based MM protocol, RFC3220, Jan. 2002.

(Continued)

*Primary Examiner* — Tan H Trinh
(74) *Attorney, Agent, or Firm* — Vierra Magen Marcus LLP

(57) ABSTRACT

A satellite network comprises networks nodes including multiple satellites, multiple gateways, additional servers and a mobile vehicle (e.g., an aircraft). All of (or a subset) of the network nodes include switches. The network implements a software defined network that includes a mobility manager as part of the management plane, a network controller as part of the control plane, and the switches on the network nodes as the data plane. In one embodiment, the switches communicate using an Open Flow communications protocol and make routing decisions based on flow tables. The mobility manager communicates with, and manages, the switches via the network controller. The mobility manager proactively generate updates to flow tables based on satellite ephemeris data for the multiple satellites and itinerary data for the aircraft, and pushes the updates to the switches in response to determining that the aircraft needs to be handed off between satellites.

11 Claims, 12 Drawing Sheets

(56) References Cited

U.S. PATENT DOCUMENTS

| | | | | |
|---|---|---|---|---|
| 6,741,841 | B1* | 5/2004 | Mitchell | H04B 7/18508 348/E7.093 |
| 6,754,489 | B1* | 6/2004 | Roux | H04B 7/18508 455/12.1 |
| 7,599,691 | B1* | 10/2009 | Mitchell | G06Q 30/02 455/3.02 |
| 8,712,321 | B1* | 4/2014 | Dankberg | H04B 7/18513 455/12.1 |
| 2003/0032426 | A1* | 2/2003 | Gilbert | H04W 84/02 455/427 |
| 2004/0198347 | A1* | 10/2004 | Roux | H04B 7/18508 455/431 |
| 2005/0026608 | A1* | 2/2005 | Kallio | H04B 7/18563 455/431 |
| 2005/0070288 | A1* | 3/2005 | Belkin | H04W 36/0066 455/439 |
| 2005/0239404 | A1* | 10/2005 | Karabinis | H04B 7/18563 455/12.1 |
| 2005/0260948 | A1* | 11/2005 | Regulinski | H04B 7/18513 455/12.1 |
| 2006/0235581 | A1* | 10/2006 | Petillon | B64D 45/04 701/3 |
| 2006/0262724 | A1* | 11/2006 | Friedman | H04B 7/18582 370/235 |
| 2007/0123252 | A1* | 5/2007 | Tronc | H04B 7/18563 455/427 |
| 2008/0170536 | A1* | 7/2008 | Marshack | H04B 7/18521 370/316 |
| 2011/0077002 | A1* | 3/2011 | Dutta | H04B 7/18545 455/427 |
| 2011/0144911 | A1* | 6/2011 | Madhavan | G01C 21/00 701/472 |
| 2014/0254373 | A1* | 9/2014 | Varma | H04W 40/36 370/235 |
| 2015/0023210 | A1* | 1/2015 | Kis | H04L 41/0806 370/254 |
| 2015/0024677 | A1* | 1/2015 | Gopal | H04B 7/2041 455/13.1 |
| 2015/0180783 | A1* | 6/2015 | Crasta | H04L 47/2483 370/235 |
| 2016/0323800 | A1* | 11/2016 | Ulupinar | H04W 36/38 |
| 2017/0041230 | A1* | 2/2017 | Huang | H04L 45/745 |
| 2017/0041830 | A1* | 2/2017 | Davis | H04W 36/0005 |
| 2017/0093482 | A1* | 3/2017 | Keshet | H04B 7/18513 |
| 2017/0180038 | A1* | 6/2017 | Oza | H04B 7/18513 |
| 2017/0200379 | A1* | 7/2017 | Rizzi | G01S 19/00 |
| 2017/0207994 | A1* | 7/2017 | Lin | H04L 45/02 |
| 2017/0230104 | A1* | 8/2017 | Purkayastha | H04B 7/18541 |
| 2017/0289004 | A1* | 10/2017 | Hu | H04L 43/16 |
| 2017/0289822 | A1* | 10/2017 | Hreha | H04W 16/28 |
| 2017/0311249 | A1* | 10/2017 | Lopes | H04W 76/30 |
| 2017/0339710 | A1* | 11/2017 | Johnson | H04W 72/1257 |
| 2017/0374596 | A1* | 12/2017 | Benammar | H04W 36/30 |
| 2018/0006370 | A1* | 1/2018 | Hreha | H01Q 3/2682 |
| 2018/0006714 | A1* | 1/2018 | Hreha | H04B 7/18584 |
| 2018/0041983 | A1* | 2/2018 | Mulaosmanovic | H04W 64/00 |
| 2018/0083694 | A1* | 3/2018 | Rajagopalan | H04B 7/18513 |
| 2018/0124631 | A1* | 5/2018 | Ramos de Azevedo | H04W 28/0226 |
| 2018/0219612 | A1* | 8/2018 | Naseef | H04B 7/18513 |

OTHER PUBLICATIONS

Perkins, "IP Mobility Support for IPv4," Network Working Group, Mobile IP (MIPv6 and v4): host-based MM protocol, RFC3344, Aug. 2002.

Johnson, et al., "Mobility Support in IPv6," Network Working Group, Mobile IP (MIPv6 and v4): host-based MM protocol, RFC3775, Jun. 2004.

Perkins, "IP Mobility Support for IPv4, Revised," Internet Engineering Task Force, Mobile IP (MIPv6 and v4): host-based MM protocol, RFC5944, Nov. 2010.

Devarapalli, et al., "Network Mobility (NEMO) Basic Support Protocol," Network Working Group, NEMO BSP (Network Mobility Basic Support Protocol): network-based MM protocol, RFC3963, Jan. 2005.

Soliman, et al., "Hierarchical Mobile IPv6 Mobility Management (HMIPv6)," Network Working Group, Hierarchical Mobile IP v6 (HMIPv6): RFC4140, Aug. 2005.

Soliman, et al., "Hierarchical Mobile IPv6 (HMIPv6) Mobility Management," Network Working Group, Hierarchical Mobile IP v6 (HMIPv6): RFC5380, Oct. 2008.

Koodli, "Mobile IPv6 Fast Handovers," Network Working Group, Fast Mobile IP (FMIPv6): network-based MM protocol, RFC5568 Jul. 2009.

Yokota, et al., "Fast Handovers for Proxy Mobile IPv6," Internet Engineering Task Force (IETF), Fast Mobile IP (FMIPv6): network-based MM protocol, RFC5949, Sep. 2010.

Gundavelli, et al., "Proxy Mobile IPv6," Network Working Group, Proxy Mobile IPv6 (PMIPv6): network-based MM protocol, RFC5213, Aug. 2008.

Liebsch et al., "Proxy Mobile IPv6 (PMIPv6) Localized Routing Problem Statement," Internet Engineering Task Force (IETF), Proxy Mobile IPv6 (PMIPv6): network-based MM protocol, RFC6279, Jun. 2011.

Chan, et al., "Requirements for Distributed Mobility Management," Internet Engineering Task Force (IETF), Distributed Mobility Management (DMM): RFC7333, Aug. 2014.

Liu et al., "Distributed Mobility Management: Current Practices and Gap Analysis," Internet Engineering Task Force (IETF), Distributed Mobility Management (DMM): RFC7429, Jan. 2015.

Liu, et al, "Mobility Support in Software Defined Networking," Network Working Group, Jul. 2013.

"OpenFlow Switch Specification", Open Networking Foundation, Version 1.5.1 ( Protocol version 0x06 ), Mar. 26, 2015.

Rula, et al., "When IPs Fly: A Case for Redefining Airline Communication," HotMobile'16, Feb. 23-24, 2016, St. Augustine, FL, USA.

IATA. Fact Sheet: Industry Statistics, Jun. 2017, https://www.iata.org/pressroom/facts_figures/fact_sheets/Documents/fact-sheet-industry-facts.pdf.

Federal Aviation Administration. "FAA aerospace forecast: Fiscal years 2015-2035", Technical Report OK 15-0814, Federal Aviation Administration, 2015.

Le-Duc, et al., "Towards a Proactive Handover Framework in Mobile Networks," Proceedings of the International Conference on Wireless Networks, ICWN 2016.

Bernardos, et al., "An Architecture for Software Defined Wireless Networking," IEEE Wireless Communications, Jun. 2014.

Akyildiz, et al., "A Survey of Mobility Management in Next-Generation All-IP-Based Wireless Systems," IEEE Wireless Communications, Aug. 2004.

Kreutz, "Software-Defined Networking: A Comprehensive Survey," Proceedings of the IEEE, vol. 103, No. 1, Jan. 2015.

Le, et al., "A Review of Mobility Support Paradigms for the Internet," IEEE Communications Surveys & Tutorials, 1st Quarter 2006, vol. 8, No. 1.

Mata-Calvo, et al., "Optical Feeder Links for Very High Throughput Satellites—System Perspectives," Proceedings of the Ka and Broadband Communications, Navigationand Earth Observation Conference, Oct. 2015

Reinbold, et al., "IP micro-mobility protocols," Mar. 2003, IEEE Communications Surveys & Tutorials, vol. 5, Issue 1, Third Quarter 2003.

Hreha, et al., "Satellite System Beam to Beam Handover," U.S. Appl. No. 15/173,083.

Hreha, et al., "Satellite System With Handover for Multiple Gateways," U.S. Appl. No. 15/173,097.

Wharton, et al., "Satellite System With Rolling Wave Handovers," U.S. Appl. No. 15/218,009.

* cited by examiner

Figure 6
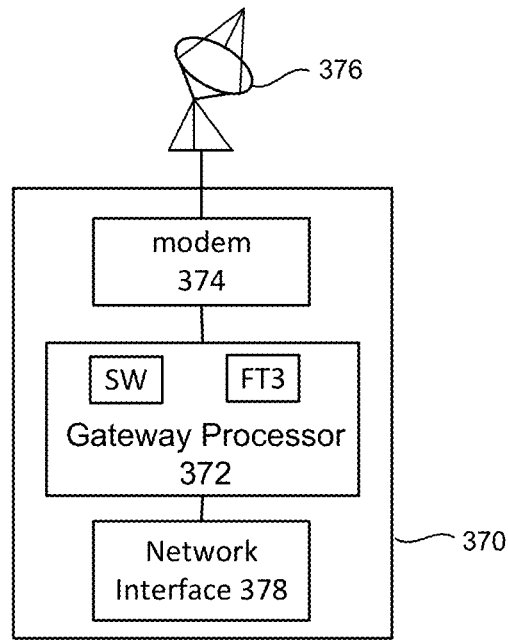
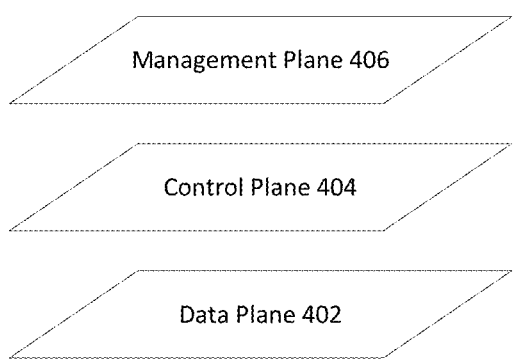
Figure 7

SATELLITE NETWORK SWITCHING

BACKGROUND

Communications systems using satellites generally include one or more communications satellites that orbit the Earth. The satellites and associated ground stations form a satellite network having a node at each satellite. Each satellite generally has the ability to communicate with one or more ground stations on the Earth's surface (via uplinks and downlinks) as well as with other satellites (via inter-satellite links). Using these capabilities, the satellite network can provide communication between users in geographically diverse places on Earth, as well as provide access to the Internet and other network resources.

However, satellites that support high throughput communications can be complex and expensive. Additionally, the setup, operation and maintenance of satellite networks is complicated and expensive. One challenge, for example, is for satellite networks to support mobility for both roaming terminals and moving sub-nets (aircrafts, ships, other vehicles, etc.).

BRIEF DESCRIPTION OF THE DRAWINGS

FIG. 6 is a block diagram of one embodiment of a gateway.

FIG. 7 depicts one embodiment of a network architecture for a satellite network.

DETAILED DESCRIPTION

A proposed satellite network comprises networks nodes including multiple satellites, multiple gateways, additional servers and a mobile vehicle (e.g., an aircraft). All of (or a subset) of the satellite network nodes include switches. In one embodiment, the satellite network implements a software defined network ("SDN") that includes a mobility manager as part of the management plane, a network controller as part of the control plane, and the switches on the network nodes as the data plane. In one embodiment, the switches communicate using an Open Flow communications protocol and make routing decisions based on flow tables. OpenFlow is a communications protocol that gives access to the forwarding plane of a network first switch or router over the network The mobility manager communicates with, and manages, the switches via the network controller. The mobility manager proactively generate updates to flow tables based on satellite ephemeris data for the multiple satellites and itinerary data for the aircraft, and pushes the updates to the switches in response to determining that the aircraft needs to be handed off between satellites. In one embodiment, the network controller and the mobility manager are implemented on the additional servers. This proposed satellite network supports mobility, and is less complicated and less expensive to setup, operate and maintain than previous satellite networks.

In one embodiment, a constellation of satellites, a plurality of ground stations (e.g., gateways and other ground stations), a plurality of roaming terminals and a plurality of roaming sub-networks (subnets) form a satellite network that includes communication between satellites and terminals as well as communication between satellites.

Figure 1:
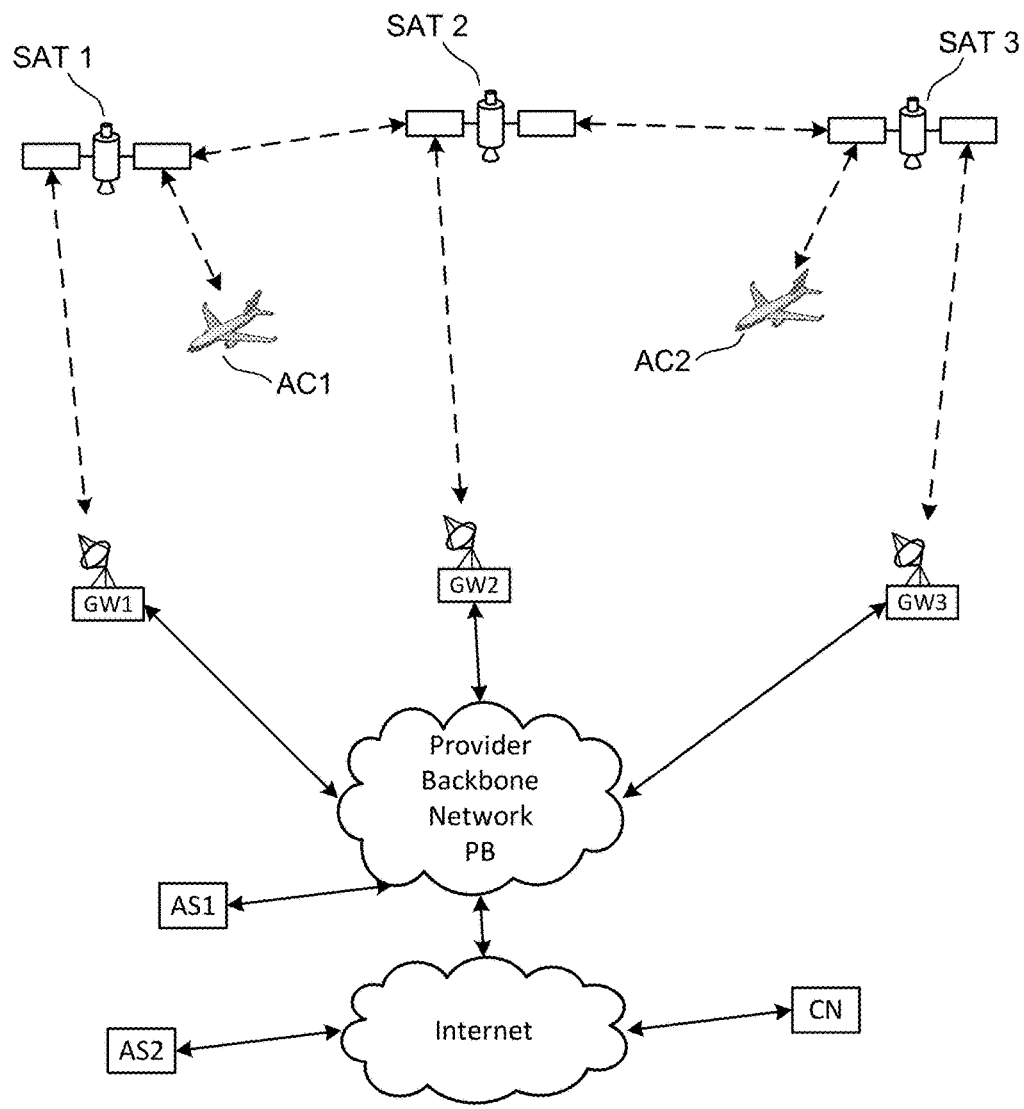
FIG. 1 depicts a portion of one embodiment of a satellite network.

FIG. 1 depicts a portion of a satellite network that includes communication between satellites and ground terminals as well as communication between satellites. The satellite network includes satellites SAT 1, SAT 2 and SAT 3. In some embodiments, the satellite network will include more or less than three satellites. The three satellites depicted in FIG. 1 are only a subset of satellites in one example of a satellite network. As depicted by dashed arrows in FIG. 1, the satellites wirelessly communicate with other satellites in the satellite network via inter-satellite links. For example, FIG. 1 shows satellite SAT 1 communicating with satellite SAT 2, and SAT 2 communicating with satellite SAT 2. In one embodiment, satellites communicate with neighboring satellites of the satellite constellation. In other embodiments, other configurations can be used implement direct wireless links between satellites. Satellites that do not have direct wireless links between them can still communicate with each other via other satellites with direct wireless links. For example, satellite SAT 1 can communicate with satellite SAT 3 via satellite SAT 2.

Satellites SAT 1, SAT 2 and SAT 3 can be geostationary satellites or non-geostationary satellites. A geostationary satellite moves in a geosynchronous orbit (having a period of rotation synchronous with that of the Earth's rotation) in the plane of the Equator, so that it remains stationary in relation to a fixed point on the Earth's surface. This orbit is often achieved at an altitude of 22,300 miles (35,900 km) above the earth; however, other altitudes can also be used. A non-geostationary satellite is a satellite that is not a geostationary satellite and is not in an orbit that causes the satellite to remain stationary in relation to a fixed point on the Earth's surface. Examples of non-geostationary satellites include (but are not limited to) satellites in Low Earth Orbits ("LEO"), Medium Earth Orbits ("MEO") or Highly Elliptical Orbits ("HEO"). In one embodiment, the satellite comprises a bus (i.e., spacecraft) and one or more payloads, including a communications payload. The satellite may also include multiple power sources, such as batteries, solar panels, and one or more propulsion systems, for operating the bus and the payload. The satellite payload includes an antenna system that provides a plurality of beams, including non-articulated and steerable spot beams, for communicating with subscriber terminals and gateways. The communications payloads of the satellites in the satellite network include the switches described below.

FIG. 1 also shows gateways GW1, GW2 and GW3. In some embodiments, the satellite network will include more or less than three gateways. The three gateways depicted in FIG. 1 are only a subset of the gateways in one example of a satellite network. Gateway GW1 is in communication with satellite SAT 1 and Provider backbone Network PB. Gateway GW2 is in communication with satellite SAT 3 and Provider backbone Network PB. Gateway GW2 is in communication with satellite SAT 3 and Provider backbone Network PB. Each of the gateways serve as an interface between the space segment of the network and the ground based network. Provider backbone Network PB is connected to the Internet so that gateways GW1, GW2, and GW3 are all in communication with the Internet via Provider backbone Network PB. Although FIG. 1 shows one gateway per satellite, other embodiments include multiple gateways per satellite. FIG. 1 also depicts correspondent noted CN, which is one example entity connected to the Internet that is communicating with one or more entities on the satellite network. Note that Provider backbone Network PB and the Internet are both examples of terrestrial networks (networks on the ground).

The satellite network of FIG. 1 supports mobility for both roaming terminals (e.g., on aircrafts, ships, busses, cars other vehicles, etc.) and moving sub-nets (e.g., aircrafts, ships, busses, cars, other vehicles, etc.). For example, one embodiment supports communication between satellites and aircraft. In other embodiments, the communication processes and functions described below can be used with other vehicles in addition to aircraft. For example purposes, FIG. 1 shows two aircraft: aircraft AC 1 currently in wireless communication with satellite SAT 1 and aircraft AC2 currently in wireless communication with satellite SAT 3. In one example, aircrafts AC1 and AC2 include a single terminal that is communicating with the satellites. In another example, one or more (or all) of the aircraft include subnets. Each of the subnets include multiple terminals that communicate with the satellites and other nodes on the satellite network. In one set of embodiments, each of the subnets on the aircraft include a switch. Terminals on aircraft communicate with entities on the Internet (see e.g., correspondent node CN) or other nodes in the satellite network via the local switch on the same aircraft and the currently connected to satellite. For examples, terminals on aircraft AC1 can communicate with correspondent node CN via a switch on aircraft AC1, satellite SAT 1, gateway GW1, Provider backbone Network PB and the Internet. There may also be a switch, firewall or server between Provider backbone Network PB and the Internet.

FIG. 1 shows aircraft AC 1 currently in wireless communication with satellite SAT 1 and aircraft AC2 currently in wireless communication with satellite SAT 3. However, aircrafts AC1 and AC2 are examples of mobile vehicles. As these aircraft move, they move away from one satellite and toward another, thereby causing a handover between satellites and gateways. For example, aircraft AC2 is currently in wireless communication with satellite SAT 3 so that terminals on aircraft AC2 communicate with Internet via satellite SAT 3 and gateway GW3. As aircraft AC2 moves away from the coverage area of satellite SAT3 and into the coverage area of satellite SAT 2, there will be a handover from SAT 3/gateway GW3 to SAT 2/gateway GW2. In addition to handovers between satellite/gateway pairs, there can also be handovers between two gateways wirelessly connected to the same satellite. More details of the handover process are described below.

FIG. 1 also shows additional servers AS1 and AS2. In other embodiments, more or less than two additional servers can be included. The additional servers can be physically connected to the Provider backbone Network PB (as depicted for AS1), the Internet (as depicted for AS2), or to other networks. The additional servers are servers (e.g., processors connected to storage devices and communication interfaces) that implement various functions described below.

Figure 2:
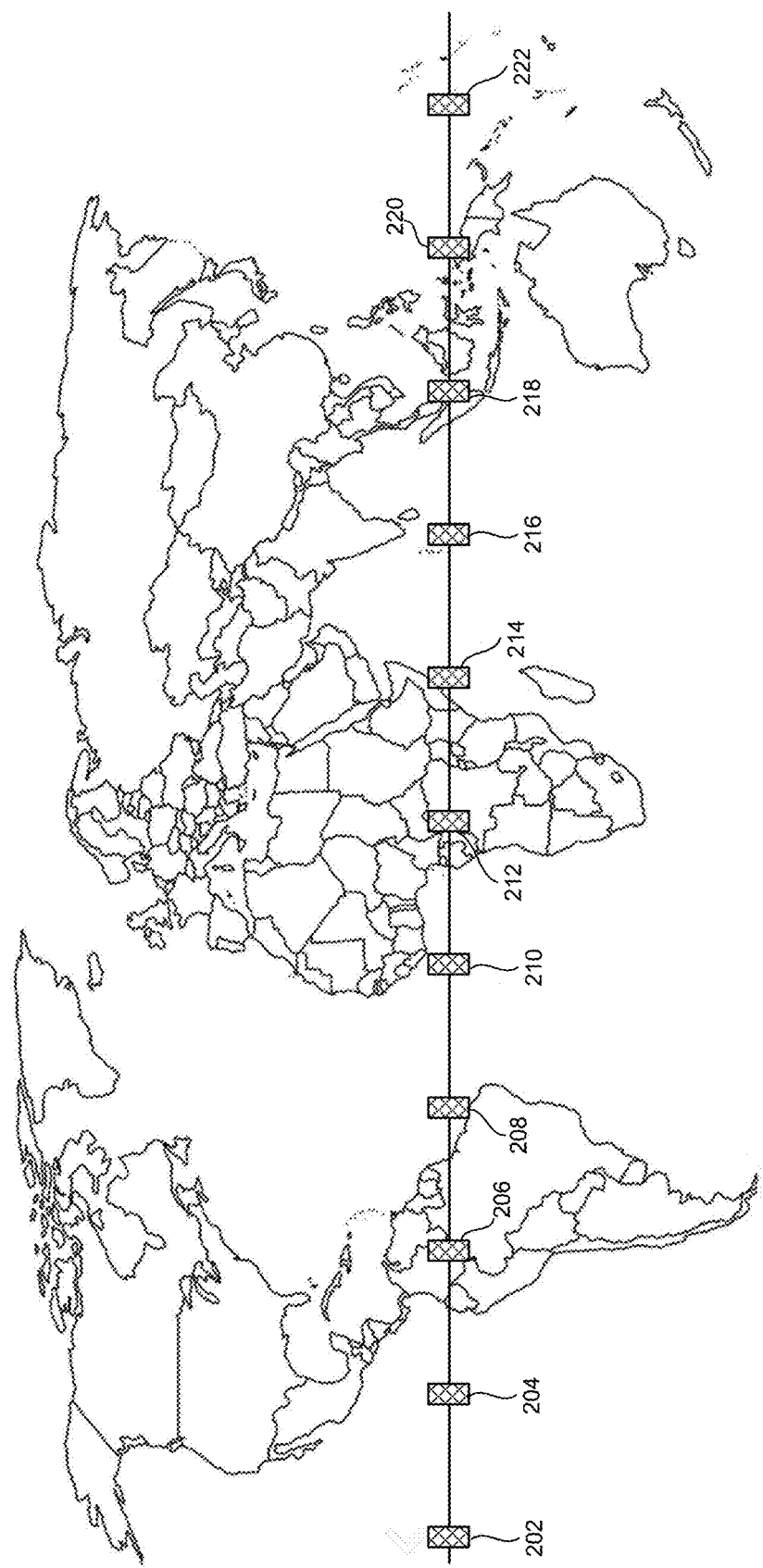
FIG. 2 depicts one embodiment of a plurality of satellites in orbit around the Earth.

In one embodiment, satellites SAT 1, SAT 2, and SAT 3 are part of a larger constellation of satellites that implement the satellite network. In one example embodiment, the satellite constellation includes eleven satellites. FIG. 2 is a map of the world showing eleven satellites 202, 204, 206, 208, 210, 212, 214, 216, 218, 220, and 222. In one embodiment, all eleven satellites are in orbit about the Equator. In one embodiment, all eleven satellites 202-222 are geostationary satellites. In one embodiment, all eleven satellites are MEO or LEO and are moving in the same orbital direction along the same orbital path and are equally spaced apart from each other. As the satellites move in orbit, the user and gateway spot beams' coverage areas will drift across the Earth's surface with the satellites. Satellites SAT 1, SAT 2, and SAT 3 of FIG. 1 can be any three consecutive satellites of satellites 202-222.

Figure 3:
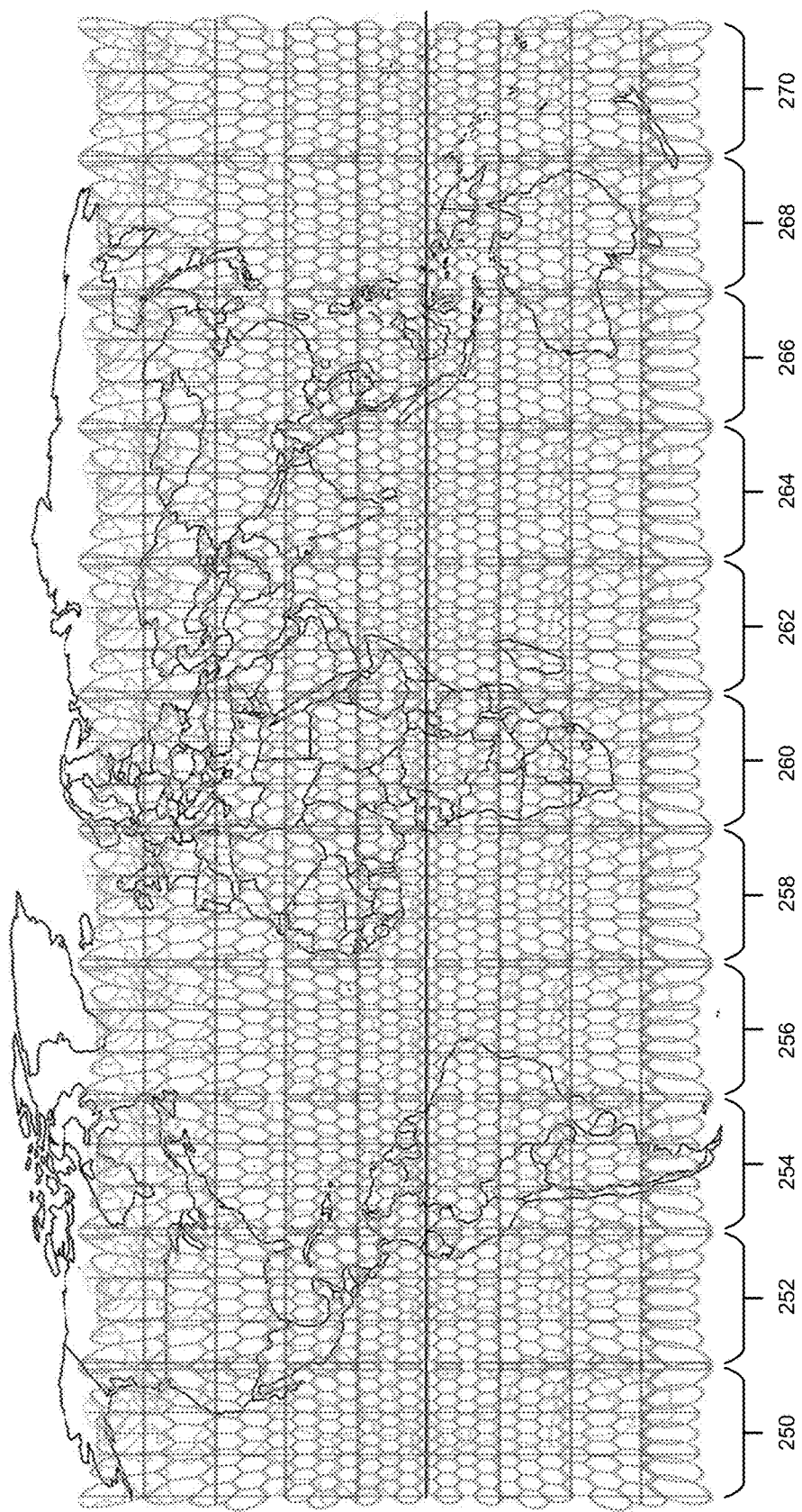
FIG. 3 depicts one example of beam patterns for a plurality of satellites in orbit around the Earth.

FIG. 3 shows the same map of the world as FIG. 2, with the beam maps for each of the satellites depicted over the map. For example, satellite 202 projects beam map 250, satellite 204 projects beam map 252, satellite 206 projects beam map 254, satellite 208 projects beam map 256, satellite 210 projects beam map 258, satellite 212 projects beam map 260, satellite 214 projects beam map 262, satellite 216 projects beam map 265, satellite 218 projects beam map 266, satellite 220 projects beam map 268, and satellite 222 projects beam map 270. In one embodiment, the beam maps of adjacent satellites overlap so that among the constellation's satellites there is continuous coverage around the globe; however, there may be gaps in coverage at the north and south poles (where there is little demand). That is, the beam map of each satellite is adjacent to a beam map on the adjacent satellite to provide a composite beam map that circumnavigates the Earth.

Figure 4:
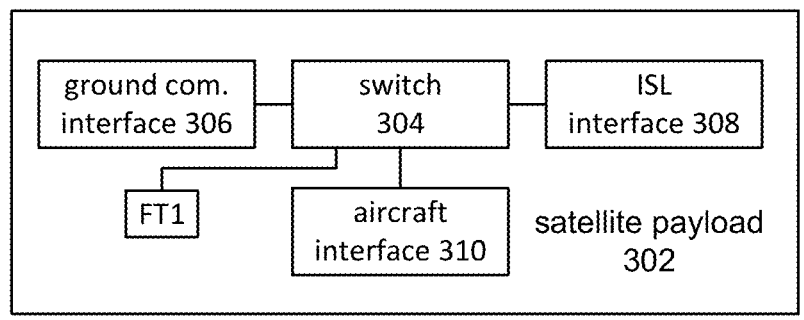
FIG. 4 is a block diagram of one embodiment of a satellite payload

FIG. 4 is a block diagram of one embodiment of a satellite payload 302, which can be an example implementation for any of satellites SAT 1, SAT 2, and SAT 3 or satellites 202-222. Satellite payload 302 includes switch 304 connected to ground communication interface 306, inter-satellite link interface 308, and aircraft (or mobile vehicle) interface 310. Satellite payload 302 also includes one or more flow tables FT1, discussed in more detail below. In one embodiment, switch 304 is a level 2 switch that communicates using an Open Flow communications protocol and makes routing decisions based on one or more flow tables FT1. Ground communication interface 306 can be a wireless RF or optical receiver/transmitter known in the art for communicating between satellites and ground stations (such as gateways and subscriber terminals). Inter-satellite link interface 308 can be a wireless RF or optical receiver/transmitter known in the art for communicating between satellites in orbit. Aircraft (or mobile vehicle) interface 310 can be a wireless RF or optical receiver/transmitter known in the art for communicating between satellites and aircraft (or other mobile vehicles) while the aircraft (or other moving vehicle) is flying/moving. Switch 304 can receive messages from any of ground communication interface 306, inter-satellite link interface 308, or aircraft interface 310 and route (send) that message to any of ground communication interface 306, inter-satellite link interface 308, or aircraft interface 310 (as well as terminate the message at the satellite). As described below, switch 304 uses one or more flow tables FT1 to determine where to route (send) a message received by the switch. In one embodiment, the satellite can be implemented without a switch. In one embodiment, a switch can include a router.

Figure 5:
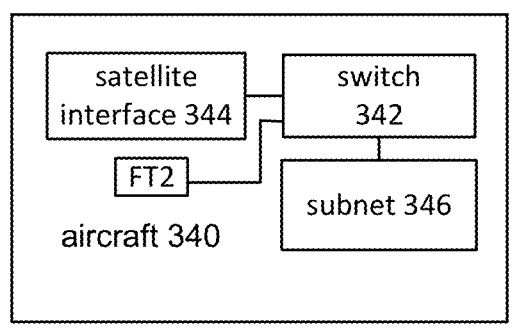
FIG. 5 is a block diagram of one embodiment of communications equipment on an aircraft or other vehicle

FIG. 5 is a block diagram of one embodiment of communications equipment on an aircraft 340 (or other mobile vehicle). For example, the components of aircraft vehicle 340 can be example implementations of aircraft AC1 (see FIG. 1), aircraft AC2 (see FIG. 1) or another mobile vehicle (e.g., ships, busses, cars other vehicles, etc.). Aircraft 340 includes switch 342 connected to satellite interface 344 and subnet 346. In one embodiment, switch 342 is a level 2 switch that communicates using an Open Flow communications protocol and makes routing decisions based on one or more flow tables FT2. Switch 342 can receive messages from any of satellite interface 344 and subnet 346 and route (send) that message to any of satellite interface 344 and subnet 346. As described below, switch 342 uses one or more flow tables FT2 to determine where to route (send) a message received by the switch. Satellite interface 344 can be a wireless RF or optical receiver/transmitter known in the art for communicating between the aircraft and one or more satellites (while the aircraft is flying/moving). In one embodiment, subnet 346 is wired and/or wireless network (e.g., LAN) that multiple terminals connect to. Thus, aircraft 340 will include multiple terminals connected to subnet 346 and in communication with the Internet via switch 342, satellite interface 344, aircraft interface 310 of satellite payload 302, switch 304, ground communication interface 306 and a gateway. One example implementation includes a plurality of laptop computers, smart phones and tablets using Wifi to connect to subnet 346 in order to access the Internet via switch 342.

FIG. 6 is a block diagram of one embodiment of a gateway 370, which can be an example implementation of any of gateways GW1, GW2 or GW3. Gateway 370 comprises a gateway processor 372 in communication with a satellite modem 374 and a network interface 378. Satellite modem 374 is connected to antenna 376 and can be a satellite modem or other components known in the art for wirelessly communicating with satellites via RF or optical transmissions. Satellite modem 374 is one example of a wireless interface configured to wirelessly communicate with a satellite that is part of a satellite network. Network interface 378 can be a standard interface for connecting to a wired or wireless network (e.g., LAN). One example of network interface 378 is an Ethernet card. Gateway processor 372 includes one or more microprocessors, storage (memory, hard drive, etc.) and one or more communication interfaces that implements the functions of a gateway. In one embodiment, gateway processor 372 includes a switch SW and a set of one or more flow tables FT3. In one embodiment, switch SW 342 is a level 2 switch that communicates using an Open Flow communications protocol and makes routing decisions based on one or more flow tables FT3.

In one embodiment, the satellite network implements a software defined network ("SDN"). SDN is an emerging networking paradigm that gives hope to change the limitations of current network infrastructures. First, it breaks the vertical integration by separating the network's control logic (the control plane) from the underlying switches (including routers) that forward the traffic (the data plane). Second, with the separation of the control and data planes, network switches become simple forwarding devices and the control logic is implemented in a logically centralized controller (or network operating system), simplifying policy enforcement and network (re)configuration and evolution. A simplified view of this architecture is shown in FIG. 7, which depicts data plane 402, control plane 404 logically above data plane 402, and management plane 406 logically above control plane 404. Data plane 403 corresponds to the networking devices, which are responsible for efficiently forwarding data. Control plane 404 represents the protocols used to populate the forwarding tables of the data plane elements. Management plane 406 includes the software services, such as simple network management protocol (SNMP)-based tools, used to remotely monitor and configure the control functionality. Network policy is defined in the management plane 406, the control plane 404 enforces the policy, and the data plane 402 executes it by forwarding data accordingly. Note that a logically centralized programmatic model does not require a physically centralized system. In many cases, production-level SDN network designs resort to physically distributed control planes.

The separation of the control plane and the data plane can be realized by means of a well-defined programming interface between the switches and the SDN controller. A network controller of control plane 404 exercises direct control over the state in the data plane elements via this well-defined application programming interface (API). The most notable example of such an API is OpenFlow. An OpenFlow switch has one or more tables of packet-handling rules (flow table). Each rule matches a subset of the traffic and performs certain actions (dropping, forwarding, modifying, etc.) on the traffic. Depending on the rules installed by a network controller application, an OpenFlow switch can be instructed by the network controller to behave like a router, switch, firewall, or perform other roles (e.g., load balancer, traffic shaper, and in general those of a middle box).

Some embodiments of the SDN include four features:
1) The control and data planes are decoupled. Control functionality is removed from network devices that will become simple (packet) forwarding elements.
2) Forwarding decisions are flow based, instead of destination based. A flow is broadly defined by a set of packet field values acting as a match (filter) criterion and a set of actions (instructions). In the SDN/OpenFlow context, a flow is a sequence of packets between a source and a destination. All packets of a flow receive identical service policies at the forwarding devices. The flow abstraction allows unifying the behavior of different types of network devices, including routers, switches, firewalls, and middleboxes. Flow programming enables unprecedented flexibility, limited only to the capabilities of the implemented flow tables.
3) Control logic is moved to an external entity, the network controller. The network controller is a software platform that runs on commodity server technology and provides the essential resources and abstractions to facilitate the programming of forwarding devices based on a logically centralized, abstract network view. Its purpose is therefore similar to that of a traditional operating system.
4) The network is programmable through software applications running on top of the network controller that interacts with the underlying data plane devices. Note that the logical centralization of the control logic, in particular, offers several additional benefits. First, it is simpler and less error prone to modify network policies through high-level languages and software components, compared with low-level device specific configurations. Second, a control program can automatically react to spurious changes of the network state and thus maintain the high-level policies intact. Third, the centralization of the control logic in a controller with global knowledge of the network state simplifies the development of more sophisticated networking functions, services, and applications.

In some embodiments, the SDN implemented in the satellite network proposed herein can be defined by three functions: forwarding, distribution, and specification. The forwarding should allow any forwarding behavior desired by the network application (the control program) while hiding details of the underlying hardware. OpenFlow is one realization of such abstraction, which can be seen as the equivalent to a "device driver" in an operating system. The distribution should shield SDN applications from the vagaries of distributed state, making the distributed control problem a logically centralized one. Its realization requires a common distribution layer, which in SDN resides in the network controller. This layer has two essential functions. First, it is responsible for installing the control commands on the forwarding devices. Second, it collects status information about the forwarding layer (network devices and links), to offer a global network view to network applications. The specification allows a network application to express the desired network behavior without being responsible for implementing that behavior itself. This can be achieved through virtualization solutions, as well as network programming languages. These approaches map the abstract configurations that the applications express based on a simplified, abstract model of the network, into a physical configuration for the global network view exposed by the SDN controller.

Figure 8:
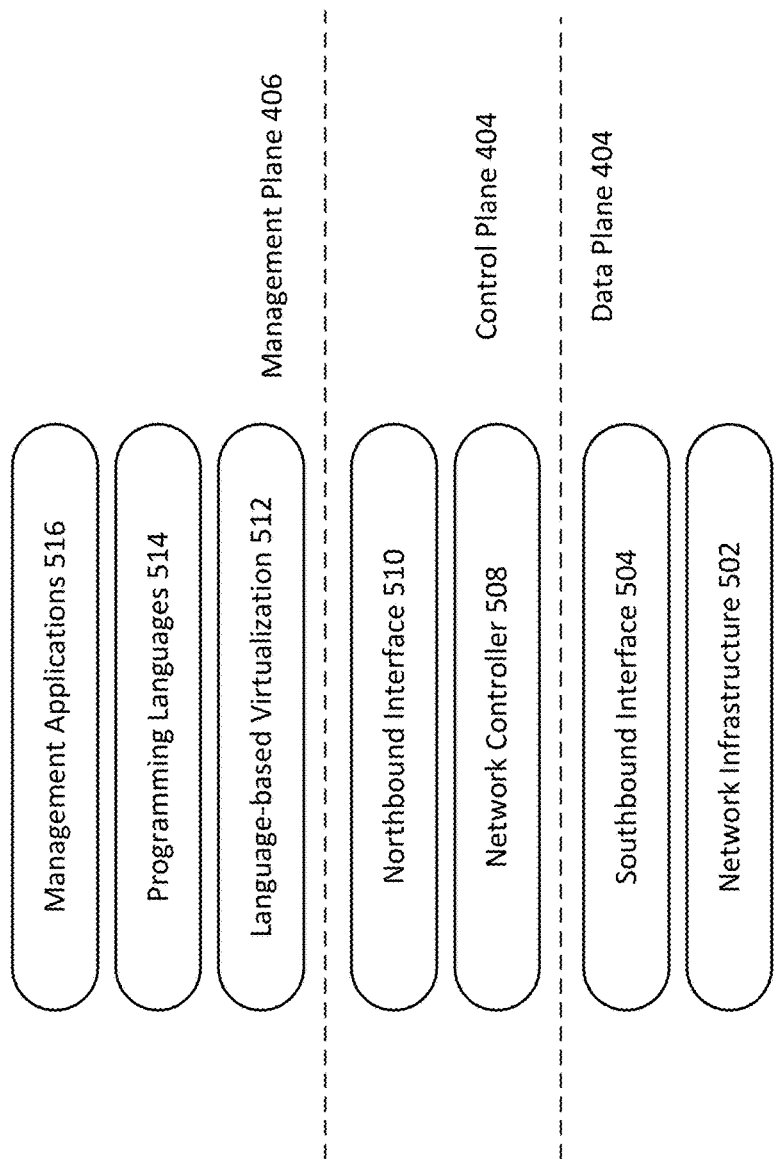
FIG. 8 depicts one embodiment of a network architecture for a satellite network.

The SDN architecture can be depicted as a composition of different layers, as shown in FIG. 8. Each layer has its own specific functions. FIG. 8 shows one embodiment of the data plane 404 comprising network infrastructure 502 and southbound interface 504. One embodiment of the control plane 404 comprises network operating system/network controller 508 and northbound interface 510. One embodiment of the management plane 406 comprises language-based virtualization 512, programming languages 514 and network applications 516.

Forwarding Devices (e.g., switches) are hardware- or software-based data plane devices that perform a set of elementary operations. Forwarding devices are interconnected through wireless channels or wired cables. The network infrastructure 5-2 comprises the interconnected forwarding devices. The forwarding devices have well defined instruction sets (e.g., flow rules) used to take actions on the incoming packets (e.g., forward to specific ports, drop, forward to the controller, rewrite some header). These instructions are defined by southbound interface 504 (e.g., OpenFlow) and are installed in the forwarding devices by the network controller 508 implementing the southbound protocols of southbound interface 504.

The instruction set of the forwarding devices is defined by the southbound interface 504, which is an application programming interface ("API"). Furthermore, the southbound interface 504 also defines the communication protocol between forwarding devices and control plane 404. This protocol formalizes the way the control and data plane elements interact. Forwarding devices are programmed by control plane elements through the well-defined southbound interface 504. The network controller 508 of control plane 404 can therefore be seen as the "network brain." All control logic rests in the applications and controllers, which form the control plane 404.

Network controller 508 can offer an API to application developers. This API is referred to as the northbound interface 510 and is a common interface for developing applications. Typically, a northbound interface 510 abstracts the low-level instruction sets used by southbound interfaces to program forwarding devices using a language based virtualization layer 512.

Management plane 406 is the set of applications that leverage the functions offered by the northbound interface 510 to implement network control and operation logic. This includes applications 516 such as routing, firewalls, load balancers, monitoring, mobility management and so forth. Essentially, a management application defines the policies, which are ultimately translated to southbound-specific instructions that program the behavior of the forwarding devices. The management applications 516 leverage various programming languages 514.

SDN is promised to facilitate network management and ease the burden of solving networking problems by means of the logically centralized control offered by a network controller. As with traditional operating systems, the crucial value of a network controller is to provide abstractions, essential services, and common APIs to developers. Generic functionality as network state and network topology information, device discovery, and distribution of network configuration can be provided as services of the network controller. With network controllers, to define network policies a developer no longer needs to care about the low-level details of data distribution among routing elements, for instance. Such systems can arguably create a new environment capable of fostering innovation at a faster pace by reducing the inherent complexity of creating new network protocols and network applications.

Network applications 516 can be seen as the "network brains." They implement the control logic that will be translated into commands to be installed in the data plane, dictating the behavior of the forwarding devices. Take a simple application as routing as an example. The logic of this application is to define the path through which packets will flow from point A to point B. To achieve this goal, a routing application has to, based on the topology input, decide on the path to use and instruct the controller to install the respective forwarding rules in all forwarding devices on the chosen path, from A to B. SDNs can be deployed on any traditional network environment, from home and enterprise networks to data centers and Internet exchange points. Such variety of environments has led to a wide array of network applications. Existing network applications perform traditional functionality such as routing, load balancing, and security policy enforcement, but also explore novel approaches, such as reducing power consumption. Other examples include fail-over and reliability functionalities to the data plane, end-to-end QoS enforcement, network virtualization, mobility management in wireless networks, among many others.

Figure 9:
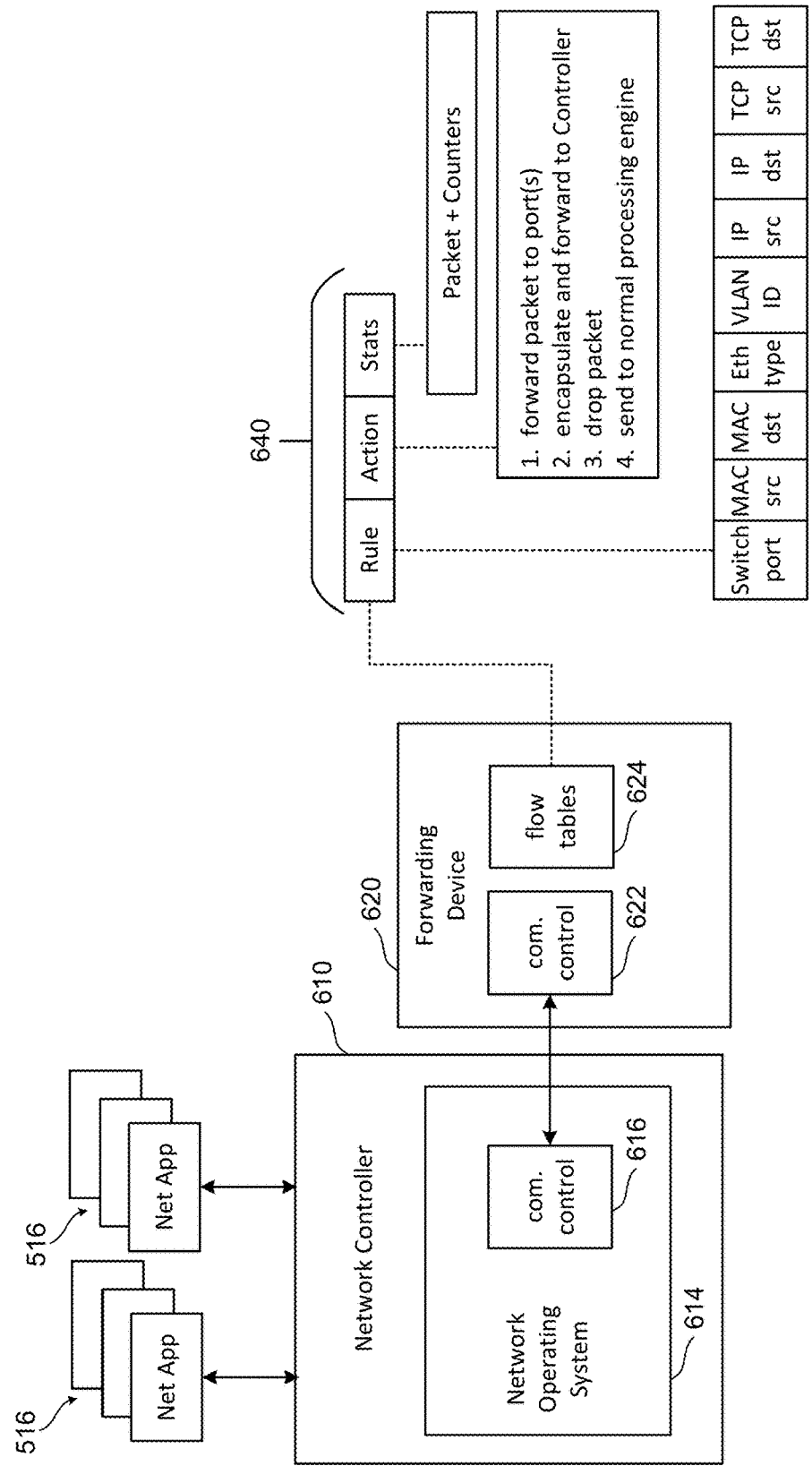
FIG. 9 is a block diagram depicting one embodiment of a controller, a switch and a flow table.

An SDN infrastructure, similarly to a traditional network, is composed of a set of networking equipment (switches, routers, and middlebox appliances). The main difference resides in the fact that those traditional physical devices are now simple forwarding elements without embedded control or software to take autonomous decisions. The network intelligence is removed from the data plane devices to a logically centralized control system, i.e., the network controller and applications. In an SDN/OpenFlow architecture, there are two main elements, the network controller 610 and the forwarding devices 620, as shown in FIG. 9. Network controller 610 of FIG. 9 is an example implementation of network controller 508 of FIG. 8. Forwarding device 620 is an example implementation of a forwarding device (e.g. switch) of network infrastructure 502 of FIG. 8.

A data plane device, such as forwarding device 620, is a hardware or software element specialized in packet forwarding, while a network controller is a software stack (the "network brain") running on a commodity hardware platform. One embodiment of forwarding device 620 includes communication control module 622 and flow tables 624. One embodiment of network controller 610 includes a network operating system 614 and communication control module 616, which is in communication with communication control module 622 of forwarding device 620. Network controller 610 is in communication with a plurality of network applications 516 of the management plane.

An OpenFlow enabled forwarding device 620 is based on a pipeline of flow tables where each entry/record 640 of a flow table has three parts: 1) a matching rule; 2) actions to be executed on matching packets; and 3) counters that keep statistics of matching packets. Inside an OpenFlow forwarding device 620 (e.g., a switch), a path through a sequence of flow tables defines how packets should be handled. When a new packet arrives, the lookup process starts in the first table and ends either with a match in one of the tables of the pipeline or with a miss (when no rule is found for that packet). A flow rule can be defined by combining different matching fields. Each rule corresponds to a record in the flow table. If there are no matches, a default rule of a default record is used. If there is no default rule, the packet will be discarded. However, one embodiment includes installing a default rule which tells the switch to send the packet to the controller (or to the normal non-OpenFlow pipeline of the switch). The priority of the rules (records) follows the natural sequence number of the tables and the row order in a flow table. Possible actions include: 1) forward the packet to outgoing port(s); 2) encapsulate it and forward it to the controller; 3) drop it; 4) send it to the normal processing pipeline; and 5) send it to the next flow table or to special tables, such as group or metering tables introduced in the latest OpenFlow protocol. Rules can define any one or combination of switch port, MAC source, MAC destination, Ethernet type, VLAN ID, source IP address, destination IP address, source TCP address, destination TCP address, as well as other fields.

The OpenFlow protocol provides three information sources for network controllers. First, event based messages are sent by forwarding devices to the network controller when a link or port change is triggered. Second, flow statistics are generated by the forwarding devices and collected by the network controller. Third, packet-in messages are sent by forwarding devices to the network controller when they do not known what to do with a new incoming flow or because there is an explicit "send to controller" action in the matched entry of the flow table. These information channels are the essential means to provide flow-level information to the network controller.

Figure 10:
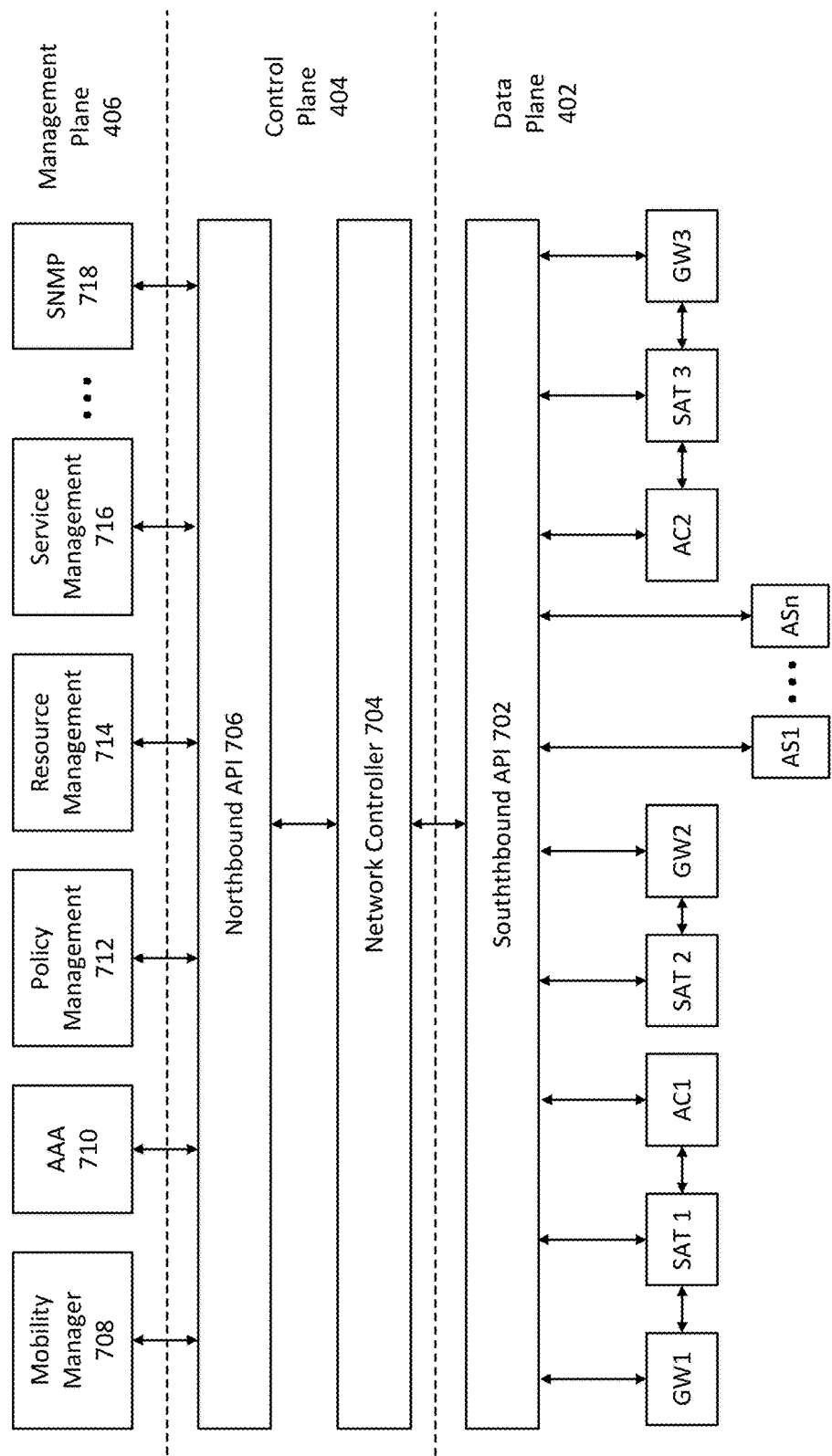
FIG. 10 is a block diagram depicting one embodiment of a satellite network.

FIG. 10 is a block diagram depicting one embodiment of a satellite network that is an example implementation of the SDN of FIGS. 7-9 using the components of FIGS. 1, 4, 5 and 6. FIG. 10 shows data plane 402, control plane 404 and management plane 406. Data plane 402 includes southbound API 702, which corresponds to southbound interface 504 of FIG. 6. Additionally, data plane 402 includes satellites SAT 1, SAT 2, and SAT 3. The portions of the satellites that are part of data plane 402 include the switches on those satellites (e.g., switch 304 of FIG. 4). FIG. 10 also shows that data plane 402 includes gateways GW1, GW2, and GW3, as well as aircraft AC1, aircraft AC2 and additional servers AS1 ... ASn. For the gateways and aircraft, it is the switches (forwarding devices) that are part of data plane 402. Each of the above listed components of data plane 402 are in communication with southbound API 702. In addition, satellite SAT 1 is in direct wireless communication with aircraft AC1 and gateway GW1, satellite SAT 2 is in direct wireless communication with gateway GW2, and satellite SAT 3 is in direct wireless communication with aircraft AC2 and gateway GW3 (as also depicted in FIG. 1).

Control plane 404 of FIG. 10 includes network controller 704 and northbound API 706. Network controller 704 corresponds to network controller 508 of FIG. 6. Northbound API 706 corresponds to northbound interface 510 of FIG. 6. Network controller 704 is in direct communication with southbound API 702 and northbound API 706.

Management plane 406 of FIG. 10 includes mobility manager 708, authentication/authorization/accounting (AAA) module 710, policy management module 712, resource management module 714, service management module 716 and SNMP 718, all of which are in communication with northbound API 706.

In one embodiment, network controller 704 includes software running on any one of the gateways. In another embodiment, network controller 704 runs on one of the additional servers AS1 ... ASn. In other embodiments, network controller can be implemented on a separate machine that is connected to the SDN. Network controller 704 can be implemented on a computer within provider backbone network PB (see FIG. 1) or on a computer that is in communication via the Internet. Network controller 704 can be implemented on any of the other nodes of the satellite network. Each of the components of management plane 406 depicted in FIG. 10 can be implemented on any of the additional servers AS1 ... ASn or any of the gateways. In one embodiment, network controller 704 and mobility manager 708 are software components running on the same gateway.

Mobility manager 708 manages connections with mobile vehicles such as the aircraft ASC1 and AC2, is responsible for handovers of communication with the mobile vehicles from satellite/gateway pairs, and (in one embodiment) is configured to generate updates to the flow tables for switches affected by handovers (or other events. AAA 710 is in charge of authenticating, authorizing and performing accounting for mobile vehicles and other users. Policy management 712 sets operating policy for the SDN. Resource management 714 manages how much bandwidth each user, device or node gets to use on the network. Resource management 714 also manages other resources of the network. Service management 716 manages operation of network resources. For example, service management 716 will enable various services and Quality of Service for various users, nodes, etc. In other embodiments, management plane 406 can include other components.

Looking back at FIG. 6 in conjunction with FIGS. 9 and 10, gateway processor 372 is in communication with modem 374 (e.g., wireless interface) in order to communicate with a switch (i.e. Forwarding Device 620) via modem 374 and the satellite, where the switch is part of the satellite network (e.g., in an aircraft, satellite, or other node). One embodiment of gateway processor 372 includes a network controller 610/704 configured to manage the satellite network and communicate with the switch. The network controller 610/704 includes an application interface (e.g., Northbound API 706) configured to receive new flow table data and an instruction to update an existing flow table in the satellite network with the new flow table data.

Any of the components of data plan 402 can communicate with other components of data plane 402. Users of the satellite network can communicate with other users on the satellite network as well as resources available via the Internet. For example, a user on a subnet of an aircraft can use the satellite network to access resources on the Internet. In such a scenario, or when users on the satellite network talk to other users on the satellite network, packets are communicated between two entities. When those packets reach any of the switches (forwarding devices) in the data plane 402, that switches (forwarding devices) will perform the process of FIG. 11. In one embodiment, each of the switches in the satellites, gateways, moving vehicles (e.g., aircraft and other network nodes) will operate according to the process of FIG. 11.

Figure 11:
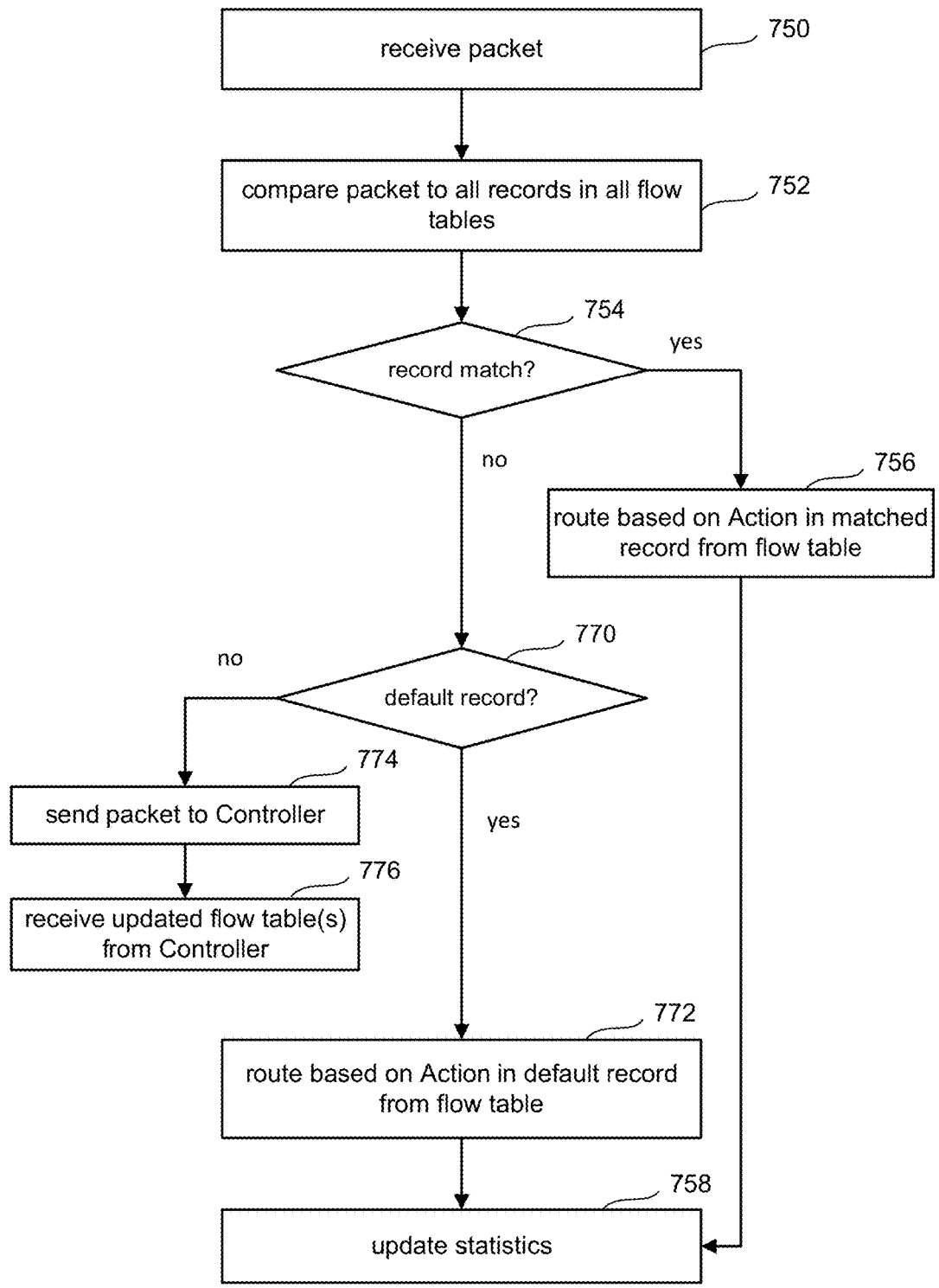
FIG. 11 is a flow chart describing one embodiment of a process for operating a switch in the satellite network.

In step 750 of FIG. 11, the switch will receive the packet (or other form of a message). In step 752 the packet is compared to the flow tables for that switch. In step 754, the switch determines whether any of the records in the flow tables match the data of the packet. FIG. 9 shows the data used to create a Rule. If the data in the received packet matches the data in the Rule, then the record matches the packet and (in step 756) that packet is routed based on the action in the matched record from the matched flow table. In step 758, the statistics for the switch are updated. If, however, no records match (step 754) then the switch determines whether it has a flow table with a default record in step 770. If there is a default record, the packet is routed based on the action in the default record. In step 758, statistics are updated. If, however, there was no default record (step 770), then the packet is sent to network controller 704. In one embodiment, network controller 704 receives the packet and determines where it should be sent. In one example implementation, network controller will then send the pack back to the switch with instructions of how to route the packet. In another embodiment, the network controller will create a new flow table (or new record for a flow table) which indicates how to route the packet. That new flow table is sent to the switch and received by the switch in step 776. The switch will then forward the packet based on the new flow table (assuming a record match).

One feature of the proposed satellite network is that flow tables are created by network controller 704 proactively and transmitted to the appropriate switches using the Open Flow protocol. Those precalculated flow tables are stored in on-board memory in the satellites, aircrafts, gateways, etc.

Figure 12:
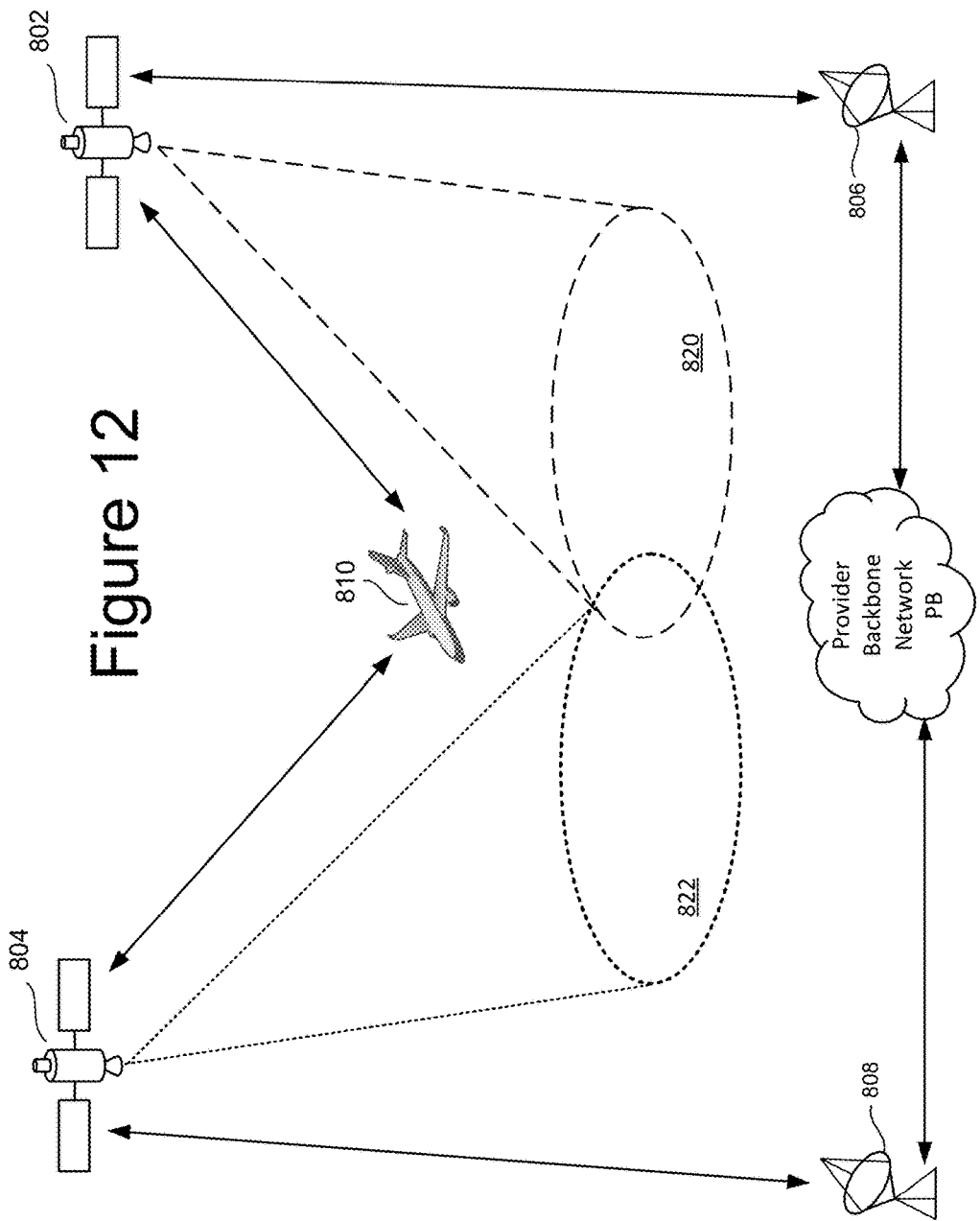
FIG. 12 depicts one embodiment of a handover in the satellite network.

One example use of the SDN technology described above is to provide a seamless handover solution for when an aircraft (or other moving vehicle) moves from a geography serviced by one satellite and gateway to a geography serviced by a different satellite and gateway. This situation is depicted by FIG. 12 which shows satellites 802 and 804 (which can be any of satellites SAT 1, SAT 2, SAT 3, etc. or any of the satellites of FIG. 2) and aircraft 810 (which can be any aircraft AC1, AC2, etc.). Satellite 802 is in communication with gateway 806. Satellite 804 is in communication with gateway 808. Gateways 806 and 808 are both connected to provider backbone network PB. Satellite 802 services region 820. Satellite 804 services region 822. Aircraft 810 has been serviced by satellite 802 and gateway 806 such that users aboard aircraft 810 are connected to the subnet on aircraft 810 to access the Internet via the switch on aircraft 810, satellite 802, gateway 806 and provider backbone network PB. However, aircraft 810 is moving towards region 822 serviced by satellite 804 and gateway 808. Thus, the satellite network has to perform a handover of aircraft 810 from satellite 802/gateway 806 to satellite 804/gateway 808.

One feature of the satellite network described above is that it will use Open Flow in a proactive mode for the flow tables in order to push updated flow tables to the appropriate switches to implement handovers. The flow tables are updated to implement the handovers based on an analysis of satellite ephemeris data (orbital data and navigation itinerary) and aircraft itineraries. That is, network controller 704 or mobility manager 708 has access to the itinerary for the aircraft 810; therefore, network controller 704 or mobility manager 708 will know where aircraft 810 should be at all times. Network controller 704 or mobility manager 708 will also have access to the ephemeris data for satellites 802 and 804; therefore, network controller 704 or mobility manager 708 will know where satellites 802 and 802 will be at all times. By knowing where the satellites will be and where the aircraft will be, network controller 704 or mobility manager 708 can predict when an aircraft will need to be handed over from one satellite to another. Prior to the upcoming time of the predicted handover, network controller or mobility manager 708 will create updated flow tables to provide updated paths for the switch on the aircraft (and other switches) to send information over the network between terminals/users on the aircraft and the Internet (or other destination). Prior to the precalculated time for the handover, network controller 704 will send the updated flow tables to the appropriate switches on the aircraft, satellites, gateways, etc. in order to have each of the switches have the new flow tables prior to handover. At the appropriate time for the handover, network controller 704 or mobility manager 708 will send one or more commands to each of the relevant switches to start using the new flow tables; thereby, implementing the handover.

Figure 13:
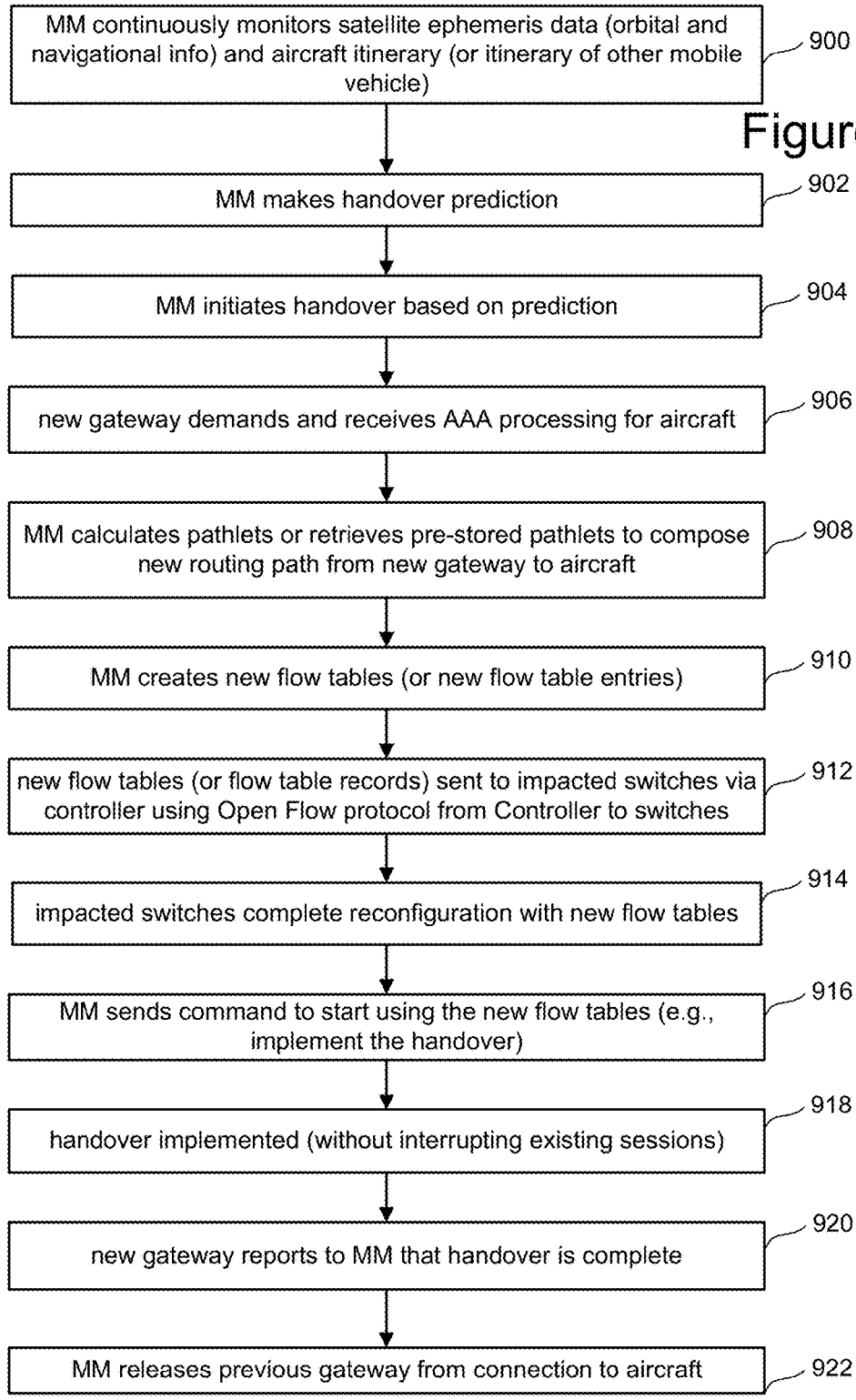
FIG. 13 is a flow chart describing one embodiment of a process for performing a handover in the satellite network.

FIG. 13 is a flow chart describing one embodiment of a process of performing a proactive handover based on pre-calculated satellite ephemeris orbital positions and aircraft flight plan itineraries. Additionally, GPS, Galileo, Glonass, and Beidou can also be used to track any of the moving components (satellites, aircraft, etc) to provide further data. In one embodiment, mobility manager 708 monitors the satellite ephemeris data and aircraft itineraries in order to instruct the network controller 704 to create and/or send out the updated flow tables. In step 900 of FIG. 13, mobility manager 709 continuously monitors satellite ephemeris data (i.e. orbital and navigational information) for the various satellites of the satellite network and aircraft itinerary information (or itineraries for other mobile vehicles). In step 902, mobility manager 708 makes a handover prediction. That is, mobility manager 708 predicts when a particular aircraft or other mobile vehicle will be handed over from one satellite/gateway pair to another satellite/gateway pair. In step 904, mobility manager 708 initiates the handover based on that prediction. In step 906, the new gateway of the satellite/gateway pair that is going to receive the aircraft or other mobile vehicle demands AAA processing from AAA module 710 in order to authenticate the aircraft, make sure the aircraft is authorized, and set up any accounting for the users on the aircraft. That AAA processing is provided to the gateway as part of step 906.

In step 908, mobility manager 708 calculates pathlets (paths and/or sub-paths) for new routing from the new gateway to the aircraft. Alternatively, mobility manager 708 can access prestored pathlets. Either way, new pathlets are accessed and/or composed. In step 910, mobility manager 708 creates the new flow tables (or new records for the flow tables). In one embodiment, mobility manager 708 has the flow tables created or updated by instructing network controller 704 to create the new flow tables. In step 912, the new flow tables (or new records in the flow tables) are sent to the impacted switches via network controller 704 using an Open Flow protocol from the network controller 704 to the appropriate switches. This can be thought of as an instruction to update an existing flow table(s) (e.g., request to replace an old flow table or record with a new flow table or record). For example, the switches on the aircraft, new and old gateways, and new and old satellites are impacted and updated. In step 914, the impacted switches that received the new flow tables (or new records) are reconfigured by the new flow tables (or new records). In step 916, mobility manager 708 sends a command to all the switches to start using the new flow tables (thereby, implementing the handover). Step 916 is performed at the predicted time for the handover (the handover was predicted in step 902). As a result of the command to start using the new flow tables, the handover is implemented in 918 without interrupting existing sessions. That is, any user on the aircraft who has a video streaming or a telephone call being conducted will not experience interruptions. In step 920, the new gateway reports to mobility manager 708 that the handover is complete. In step 922, mobility manager 708 releases the previous gateway from connection to the aircraft.

Figure 14:
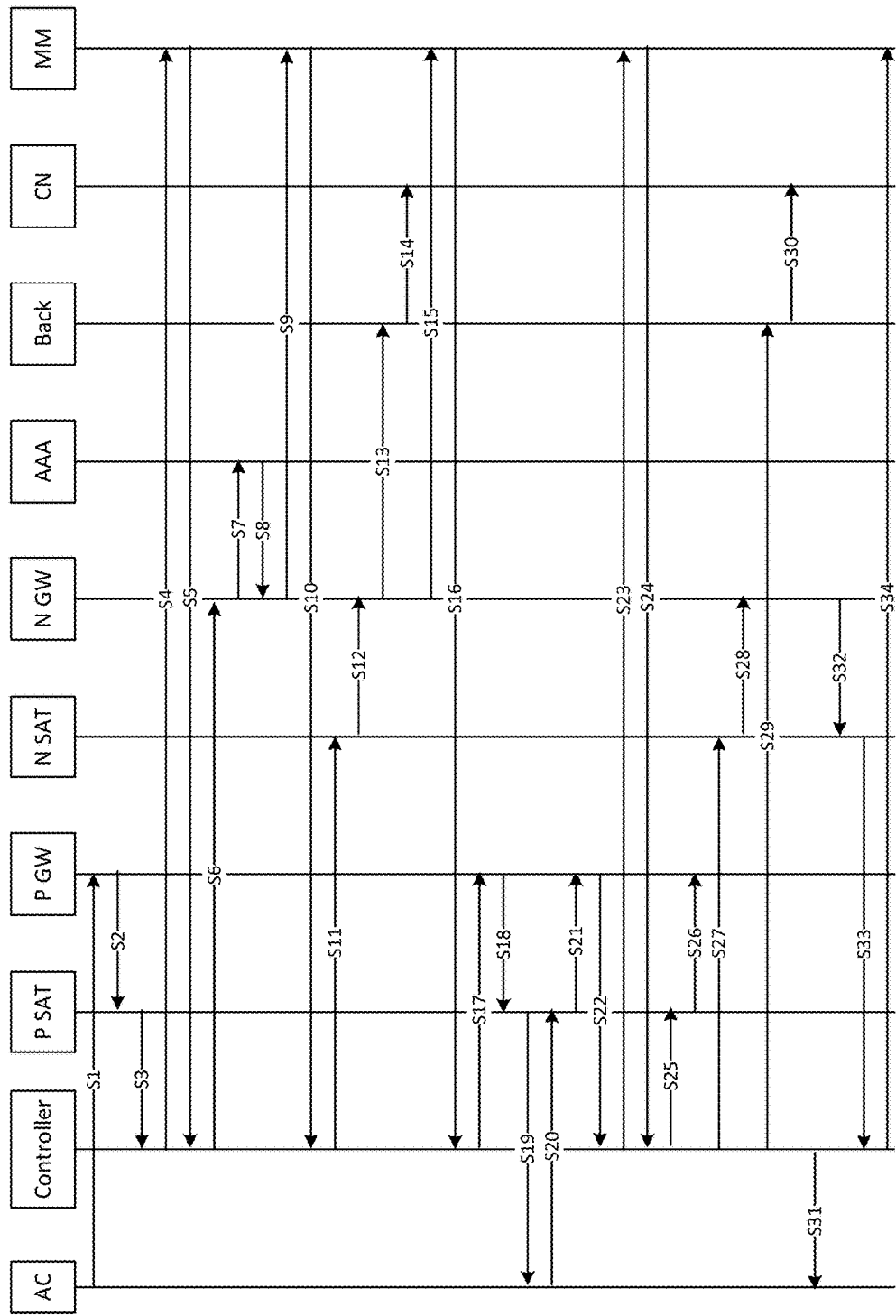
FIG. 14 is a timing diagram describing one embodiment of a process for performing a handover in the satellite network.

FIG. 14 is a timing diagram describing one embodiment of a process for performing a handover in the satellite network. That is, FIG. 14, shows more details of an example implementation of the process of FIG. 13. FIG. 14 shows 34 actions/steps S1-S34 for the following components: aircraft being handed over (AC), network controller 704 (Controller), the previous satellite that is losing the aircraft in the handover (P SAT), the previous gateway that is losing the aircraft in the handover (P DW), the new satellite that is receiving the aircraft in the handover (N SAT), the new gateway that is receiving the aircraft in the handover (N GW), AAA processing module 710 (AAA), the provider backbone network PB (Back), a correspondent node CN connected to the internet (CN) and mobility manager 708 (MM).

In step S1, the aircraft provides status report of its position to the previous gateway. In step S2, the previous gateway forwards the status report to the previous satellite. In step S3, the previous satellite forwards the status report to network controller. In step S4, the network controller forwards the status report to mobility manager 708. Steps S1-S4 correspond to step 900 of FIG. 9.

In step S5, mobility manager 708 sends a command to initiate the handover to network controller 704. In step S6, network controller 704 sends a command to initiate the handover to the new gateway. Steps S5 and S6 correspond to step 904 of FIG. 13.

In step S7, the new gateway demands AAA processing from AAA module 710. In step S8, AAA module 710 responds back to the new gateway confirming authentication and authorization. In step S9, the new gateway informs mobility manager 708 that the aircraft has been properly authenticated and authorized. Steps S7-S9 correspond to step 906 of FIG. 13.

In step S10, mobility manager 708 sends the new routing pathlets and flow table updates (new tables and/or new records) to network controller 704. In step S11, the new routing paths and flow table updates are transmitted from network controller 704 to the new satellite. Those new flow tables are then transmitted to the new gateways in step S12 and to various entities on provider backbone network in step S13. The new flow tables are also sent to a correspondent node in step S14. In step S15, the new gateway confirms receipt of the updated flow tables with mobility manager 708. In other embodiments, the new flow tables can also be provided to the previous satellite and previous gateway. Steps S10-S15 correspond to step 912 of FIG. 13.

In step S16, mobility manager 708 sends a handover command to network controller 704. In step S17, controller 704 instructs the previous gateway to reconfigure its flow tables. In step 718, the instruction to reconfigure flow tables is provided to the previous satellite. In step S19, the instruction to update the flow tables and the new flow tables are sent to the aircraft from the previous satellite. In step 720, the satellite confirms to the previous satellite that it has successfully reconfigured by updating its flow tables. In step S21, the previous satellite informs the previous gateway that both the aircraft and the satellite have reconfigured their flow tables to update to the new flow tables. In step S22, previous gateway informs the network controller 704 that the aircraft, previous satellite and previous gateway have updated their flow tables. In step S23, network controller 704 informs mobility manager 708 that the reconfiguration that includes updating the flow tables has been performed successfully. Steps S16-S23 correspond to step 914 of FIG. 13.

In step S24, mobility manager 708 sends a command to start using the new flow tables. This command is sent to network controller 704. Step S24 corresponds to step 916 of FIG. 13.

In step S25, network controller 704 sends the instruction to implement the handover to the previous satellite. That instruction to implement the handover is forwarded to the previous gateway in step S26. In step S27, controller 704 sends the instruction to the new satellite to implement the handover. In step S28, the new satellite forwards that instruction to the new gateway. In other embodiments, the instructions can be sent to the new gateway first and then forwarded to the new satellite. In step S29, network controller 704 sends the instructions to entities on the provider backbone network PB to implement the handover. That instruction to implement the handover is forwarded to any correspondent nodes in S30. In step S31, network controller 704 sends the instruction to the aircraft to start using the new flow tables, in order to implement the handover. Steps S25-S31 correspond to step 918 in FIG. 13.

In step S32, the new gateway informs the new satellite that the handover has completed. In step S33, the new satellite informs network controller 704 that the handover is completed. In step S34, network controller 704 informs mobility manager 708 that the handover has completed.

In the above scenario there are at least five sets of flow tables that are impacted: a first set of one or more flow tables at the switch on the aircraft, a second set of one or more flow tables at the switch on the previous gateway, third set of one or more flow tables at the switch on the next gateway, a fourth set of one or more flow tables at the switch on the previous satellite, and a fifth set of one or more flow tables at the switch on the next satellite.

The above-proposed satellite network supports mobility, and is less complicated and less expensive to setup, operate and maintain than previous satellite networks.

One embodiment includes an apparatus, comprising: a wireless interface configured to wirelessly communicate with a satellite that is part of a satellite network; and a processor in communication with the interface in order to communicate with a first switch via the interface and the satellite. The first switch is part of the satellite network. The processor includes a network controller configured to manage the satellite network and communicate with the first switch. The network controller includes an application interface configured to receive new flow table data and an instruction to update an existing flow table in the satellite network with the new flow table data.

One embodiment includes a satellite network system, comprising: a first satellite; a second satellite; a first network forwarding device configured to be mounted on an aircraft, the first network forwarding device includes a first set of one or more flow tables for controlling routing of communications; a satellite communication interface configured to be in communication with the first satellite and the second satellite, the satellite communication interface configured to be in communication with the first network interface, the satellite communication interface configured to be mounted on the aircraft; a first gateway configured to be in communication with the first satellite; a second gateway configured to be in communication with the second satellite; a network controller configured to be in communication with the first network forwarding device to manage the first network forwarding device; a mobility manager configured to be in communication with the network controller, the mobility manager configured to generate updates to the first set of one or more flow tables based on satellite ephemeris data and itinerary data for the aircraft.

One embodiment includes a method of operating a satellite network, comprising: monitoring satellite ephemeris data for a first satellite communicating with a first gateway and a second satellite communicating with a second gateway; monitoring itinerary data for an aircraft communicating with the first satellite and the first gateway using a switch and a first set of one or more flow tables; automatically predicting a handover of the aircraft from the first gateway and first satellite to the second gateway and second satellite based on the monitored satellite ephemeris data and the itinerary data for the aircraft; accessing new flow table data; transmitting the new flow table data to a network controller of a software defined network that includes the switch; transmitting the new flow table data from the network controller to the switch using an Open Flow communication protocol; updating first set of one or more flow tables with new flow table data; and operating the first switch using the updated first set of one or more flow tables to implement the handover.

One embodiment includes a satellite network, comprising: networks nodes comprising multiple satellites, multiple gateways, and an aircraft, the network nodes include switches, the switches include flow tables, the switches configured to communicate using an Open Flow communications protocol, the switches configured to make routing decisions based on the flow tables; a network controller; and a mobility manager, the mobility manager configured to proactively generate updates to flow tables based on satellite ephemeris data for the multiple satellites and itinerary data for the aircraft, the mobility manager configured to push the updates to the switches via the network controller in response to determining that the aircraft needs to be handed off between satellites; the satellite network is a software defined network that includes the mobility manager as part of the management plane, the network controller as part of the control plane and the switches on the network nodes as the data plane.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
    a wireless interface configured to wirelessly communicate with a satellite that is part of a satellite network;
    a processor in communication with the interface in order to communicate with a first switch via the interface and the satellite, the first switch is part of the satellite network, the processor includes a network controller configured to manage the satellite network and communicate with the first switch, the network controller includes an application interface configured to receive new flow table data and an instruction to update an existing flow table in the satellite network with the new flow table data; and
    a mobility manager in communication with the network controller, the mobility manager configured to initiate a handover for the mobile vehicle by sending new flow table data and instructions to the controller for transmission to the first switch.

2. The apparatus of claim 1, wherein:
    the instruction to update the existing flow table in the satellite network with the new flow table data is based on satellite ephemeris data and mobile vehicle itinerary data.

3. The apparatus of claim 1, further comprising:
    the mobility manager sends the instruction to update the existing flow table in the satellite network with the new flow table data based on satellite ephemeris data and mobile vehicle itinerary data.

4. The apparatus of claim 1, further comprising:
    the mobility manager configured to continuously monitor satellite ephemeris data and mobile vehicle itinerary data, the mobility manager configured to make a handover prediction for the mobile vehicle based on the monitored satellite ephemeris data and mobile vehicle itinerary data and initiate the handover based on the handover prediction, the first switch is part of a sub-network on the mobile vehicle.

5. The apparatus of claim 4, wherein:
the mobility manager configured to initiate the handover by calculating a new path between a new gateway and the mobile vehicle, generating one or more new flow table records to implement the new path, and sending a command to the new gateway to start using the one or more new flow table records to implement the handover, subsequent to sending the command the mobility manager releases a previous gateway from its connection with the mobile vehicle.

6. The apparatus of claim 4, wherein:
the wireless interface and the processor comprise a ground based gateway, the mobility manager and the network controller are implemented on the gateway.

7. The apparatus of claim 1, wherein:
the network controller configured to communicate with the first switch using Open Flow communications protocol.

8. The apparatus of claim 1, wherein:
the instruction to update the existing flow table in the satellite network with the new flow table data comprises a request to replace an old flow table with a new flow table.

9. The apparatus of claim 1, wherein:
the instruction to update the existing flow table in the satellite network with the new flow table data is based on satellite ephemeris data and mobile vehicle itinerary data;
the wireless interface and the processor comprise a ground based gateway;
the mobile vehicle is an aircraft; and
the first switch is on the aircraft.

10. The apparatus of claim 1, further comprising:
a network interface in communication with the processor and a terrestrial network; and
one or more flow tables for routing communication between the terrestrial network and the satellite network;
the wireless interface, the processor and the network interface comprise a ground based gateway, the one or more flow tables are stored on the ground based gateway.

11. The apparatus of claim 1, wherein:
the network controller configured to communicate with a second switch on the satellite and send new flow tables to the second switch in response to satellite ephemeris data.

* * * * *

UNITED STATES PATENT AND TRADEMARK OFFICE
CERTIFICATE OF CORRECTION

PATENT NO. : 10,200,922 B2  
APPLICATION NO. : 15/618897  
DATED : February 5, 2019  
INVENTOR(S) : J. Fang Page 1 of 1

It is certified that error appears in the above-identified patent and that said Letters Patent is hereby corrected as shown below:

On the Title Page

Abstract, Line 13, please change "generate updates" to -- generates updates --  
Other Publications, page 2, Column 2, Line 61, please change "Navigationand" to -- Navigation and --

Signed and Sealed this  
Fourteenth Day of May, 2019

Andrei Iancu  
*Director of the United States Patent and Trademark Office*